April 20, 1937. H. HEINE 2,077,792
ILLUMINATOR ATTACHMENT FOR MICROSCOPES
Filed Dec. 30, 1932 2 Sheets-Sheet 2
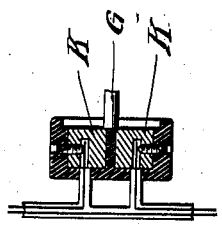
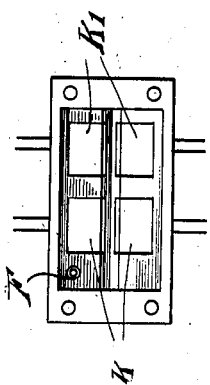
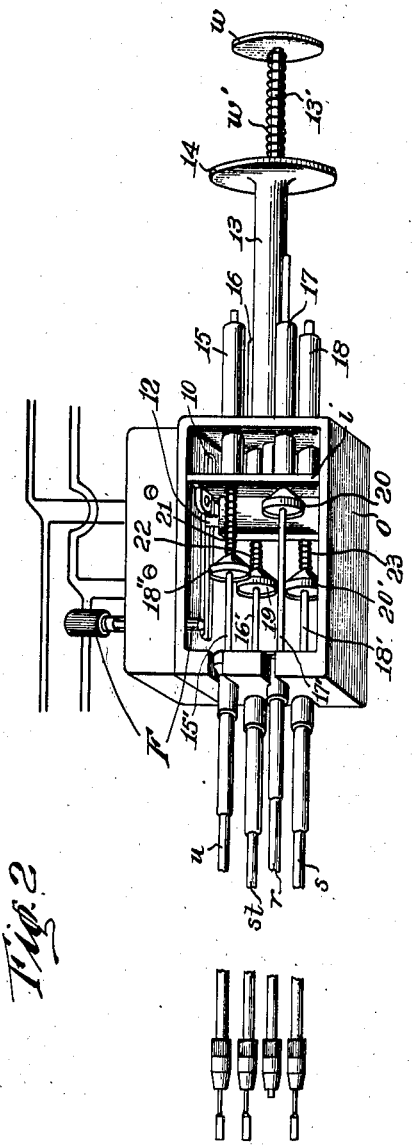
INVENTOR
Hermann Heine
BY
ATTORNEY Patented Apr. 20, 1937

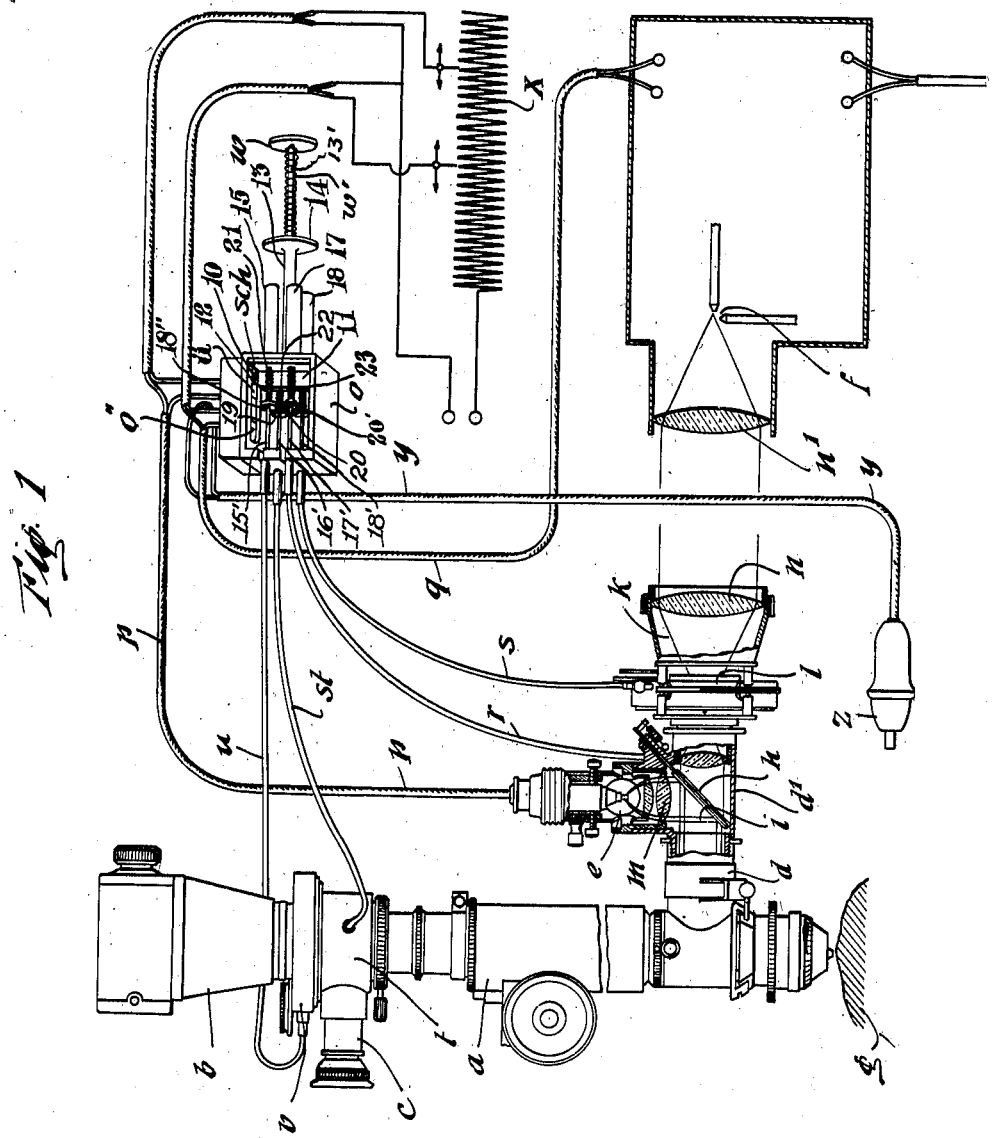

2,077,792

UNITED STATES PATENT OFFICE 2,077,792

ILLUMINATOR ATTACHMENT FOR MICROSCOPES

Hermann Heine, Wetzlar, Germany, assignor to Ernst Leitz, Optische Werke, Wetzlar, Germany Application December 30, 1932, Serial No. 649,469
In Germany January 2, 1932

1 Claim. (Cl. 88—40)

This invention relates to improvements in microscopes, particularly microscopes used with photographic cameras, and the principal object of my invention is the provision of a means to regulate the illumination in such manner as to enable the operator to either make use of a source of a weak light for the observation of the object or to cut in a source of a strong light for the making of pictures of the object.

It is essential that during the microphotographic taking of pictures the microscope including the camera is not subjected to shocks or shaken, in order not to destroy the exact focus or the distinctness of the illumination.

With the known devices of this character extreme precaution was necessary to operate the camera and in short succession close the circuit of two sources of light without shocking or shaking the instruments.

It is one of the objects of my invention to provide an illuminating system or arrangement for microscopes having a ring condenser for vertical illumination in which a mirror is arranged in the path of the illuminating rays of a vertical illuminator which can be adjusted by means of a contact releasing or disengaging device in such manner that either the light rays of a source of weak light for the making of observations, or the rays of a source for a strong light for the making of pictures may become selectively operative.

To this end I find in practice that it is best to arrange the mirror within a tubular projection of the vertical illuminator at an angle of 45° to the axes of the bunches of rays emanating from the sources of light for the making of observations or for the taking of pictures, if for instance the first named source of light is operating.

The contact controlling device is so constructed, that simultaneously with the removal of the angular mirror from the path of the illuminating rays or shortly thereafter the source of light for the taking of pictures may be cut in, while the source of light for the making of observations is cut out.

I obtain by such an arrangement of the illuminating system a perfect stable and unchangeable position of the picture and of the illumination.

These and other objects and advantages of my invention will become more fully known as the description thereof proceeds and will then be more specifically defined in the appended claims.

On the drawings:

Fig. 1 shows diagrammatically a device constructed according to my invention.

Fig. 2 is a perspective view of a somewhat modified form of contact engaging or disengaging device.

Fig. 3 is a fragmentary sectional view thereof.

Fig. 4 shows a device for locking the contact control device in the disengaged position.

As illustrated, the microscope eyepiece or tube $a$ carries or supports a camera $b$ equipped with a laterally disposed sight $c$.

An illuminator carrier $d'$ is provided on the microscope tube and vertical illuminator $d$ for the support of the leaders of the rays from sources of a stronger light $f$ and a weaker light designated $e$ respectively to the microscope to be finally directed upon the object $g$.

An adjustable inclined mirror $h$ can be cut in and out of the ray path and in its cut in position reflects the light rays $i$ of the source of the weaker light $e$ at an angle of about 45° in the direction of the microscope tube and simultaneously obturates the rays $k$ of the source of the stronger light $f$ by its opaque rear face.

Besides the shutting out of the rays by the mirror, these rays $k$ which serve to illuminate a photographic or sensitive layer from the source of the stronger light $f$, can also be shut off or set free by means of a shutter $l$ in the path of the rays, and the photographic shutter is so arranged by suitably mounting the same, eventually with the use of suspension springs, that it cannot be shocked or shaken during the operation.

In front of each source of light suitable condenser systems $m$, $n$, $n'$, are provided. Another photographic shutter $v$ is arranged on the camera $b$.

In order to deflect the light rays reflected by the object into the lateral ocular $c$ an adjustable mirror or prism is arranged in the lower part of the camera $b$.

The sources of light $e$ and $f$ are connected by means of the contact $ö$ at the end of conductor $p$, and contact $ü$ at the end of conductor $q$, said contacts being arranged on a rail 10 in box $o$.

All the releasing organs are operated by means of an operating knob $w$. If pressure is exerted upon the knob $w$ a contact pin $sch$ on a movable contact block 11 at the end of a plunger rod 13' carrying the operating knob $w$ at its outer end, and slidably arranged in a tube 13 secured to box $o$, is successively disengaged from contact $ü$ so as to open the circuit in which the source of the weaker light $e$ is located and engages contact ö to close the circuit in which the source for the stronger light f is located.

Simultaneously with these circuit opening and closing operations, the angular mirror h and the angular mirror within housing t are cut out by means of the plunger rod 13', the inner end of which is attached to block 11, while its outer end carries the knob w, held in its outermost position by means of the spring w' wound about the rod 13' between knob w and a disc 14 on tube 13. As shown in Figure 2, plungers 15', 16', 17' and 18' are slidably arranged in the tubes 15, 16, 17 and 18 extending into box o.

The inner ends of the plungers 15', 16', 17' and 18' carry heads 18'', 19, 20 and 20' respectively within the box o, and about the shanks of the plungers springs 21, 22 and 23 are wound between the block 11 and the heads 18'', 19, 20 and 20' to be compressed during the circuit closing operations, and by their expansion upon the release of knob w to carry the plungers back into their original positions, after each operation, and to these rods or plungers the pull cords r, st, u and s are attached, for opening the shutter v and thereafter shutter l which has been suitably timed. Upon the release of the knob w the parts return again into their original position, the source f of the stronger light is cut out and the source of light e is again cut in for further observations.

A switch z on conductor cord y allows a cutting in and out of the light source f independently from the releaser w, while x designates an electric resistance for the light sources.

As shown, the pull cords u and st, operating the shutter v of the camera and the mirror in housing t, and sliding through suitable recesses in the wall of the box o, are attached to the heads on the plungers 15' and 16', and the pull cords r, s also sliding through recesses in the wall of box o and operating the mirror h and shutter l are attached to the heads on the plungers 17', 18' and thus the closure of the circuit by the engagement of contact pin 12 with contact ö will close a circuit to bring the source of the stronger light f into operation and simultaneously operate the shutter v to allow the taking of a picture. The engagement of contact ü by the contact pin 12, will close a circuit to bring the source of the weaker light e into operation, and simultaneously operate mirror h and shutter t to allow the observation of the object g under the microscope.

In the modified form of my invention illustrated in Figures 2, 3, and 4, I use substantially the same construction shown in Figure 1, with the exception that I use two releasing devices which are operated by means of a sliding pin G for the operation of the contacts K, K₁. The pin G may be held in its adjusted position by means of the latching pin F.

It will be understood that I have described and shown the preferred forms of my device only as a few examples of the many possible ways to practically construct the same, and that I may make such changes in the general arrangement thereof and in the construction of its minor details without departure from the spirit of my invention and the principles involved.

Having thus described my invention, which I claim as new and desire to secure by Letters Patent is:

In an attachment for illuminating microscopes combined with a camera, a source of a weak light for illuminating the object to be observed through the microscope, and a source of strong light for taking pictures of the object observed, an adjustable mirror between the two light sources reflecting the light rays of the source of the weaker light at an angle of about 45° in the direction of the microscope and simultaneously obstructing or obturating the rays of the source of stronger light, means to alternately cut said light sources in and out by the operation of said mirror, and a control means therefor comprising a box, a rail on said box, contacts in said rail connected to the said light sources, a movable contact piece having a contact finger in said box, means to alternately bring said contact finger in and out of contact with said contacts to close either the circuit in which the source of the weaker light is located, or the circuit in which the source of the stronger light is located, shutters in the camera and in front of the source for the stronger light, to be operated by the operation of said contact finger operating means, a plurality of spring controlled pull rods in said box one of said rods connected to the mirror and the others connected to the shutters, said rods adapted to be operated by said means operating said contact finger to operate said mirror to alternately reflect the rays from the source of weak light and obturate the light rays from the source of stronger light.

HERMANN HEINE.